United States Patent Office 3,093,564
Patented June 11, 1963

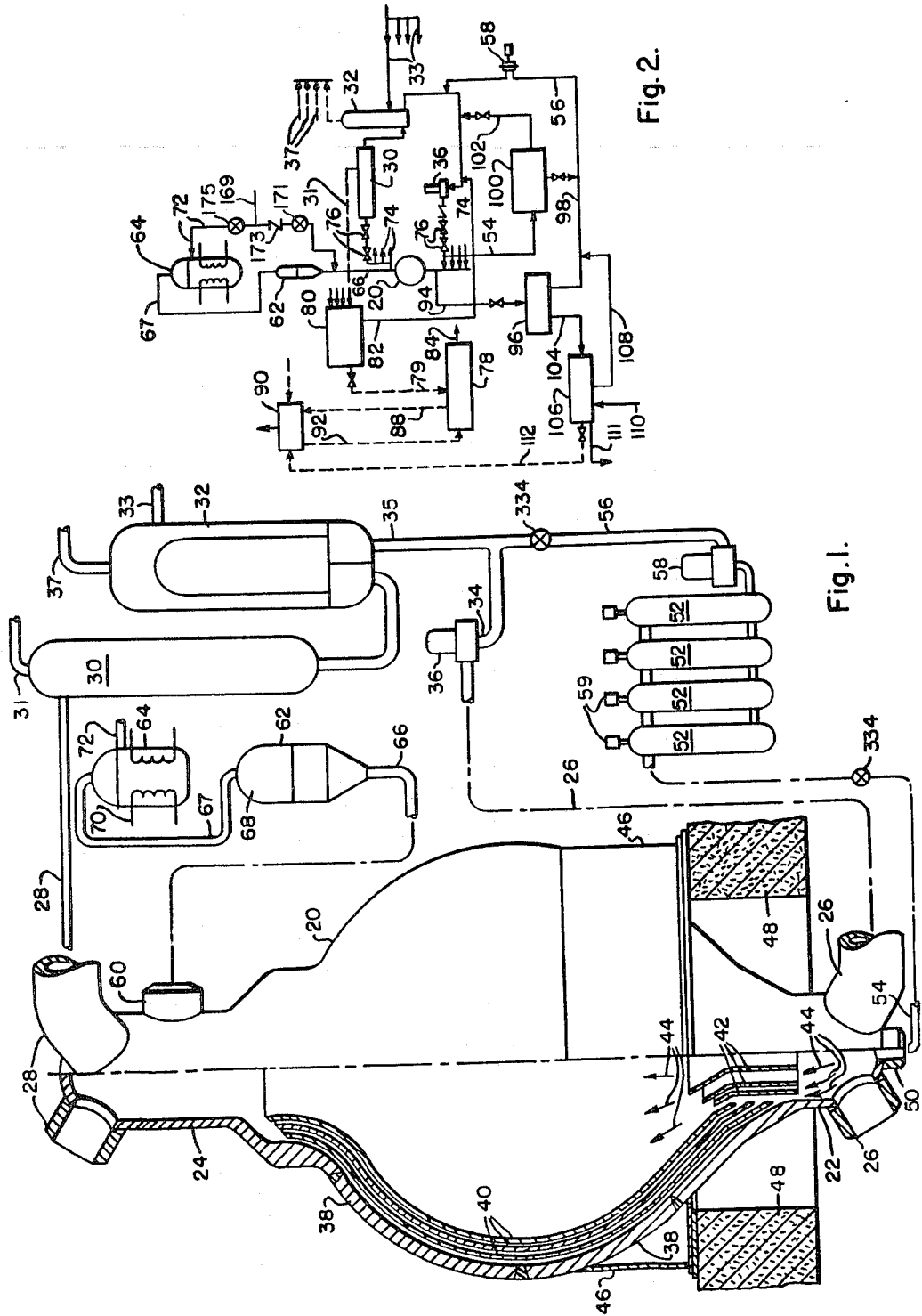

3,093,564
GAS HANDLING SYSTEMS FOR RADIOACTIVE GASES
Joel Weisman and Maurice Griffel, Pittsburgh, Pa., assignors to Westinghouse Electric Corporation, East Pittsburgh, Pa., a corporation of Pennsylvania
Filed Oct. 21, 1957, Ser. No. 691,263
6 Claims. (Cl. 204—193.2)

The present invention relates to a method and arrangement for separating and eliminating radioactive gases, and more particularly to an arrangement and method of the character described adapted for use with a neutronic reactor plant for separating and delaying or holding-up elimination of these gases until their attendant radioactivity has decayed to tolerable levels.

In connection with previous reactor schemes, it has been proposed to adsorb the radioactive fission gases in charcoal beds which, when having been saturated, are deposited in shielded burial vaults or otherwise disposed of. This arrangement is feasible for use with relatively small experimental or research type nuclear reactors wherein a relatively small quantity of fission gases is produced and economical thermal or electrical output is not a primary objective. In the latter instance, however, such an arrangement is extremely expensive even in the case of the smallest nuclear reactors presently in existence or under construction. On the other hand, in the case of a relatively large power reactor, the size of charcoal beds would be prohibitive not only from a monetary standpoint but in regard to space considerations as well.

The present invention contemplates a gaseous fission product elimination system, or off-gas system, which permits adequate decay of the fission gases and also reuse of the charcoal beds. During the forthcoming description of illustrative arrangements of the invention, the off-gas system will be described in connection with a quasi-homogeneous reactor plant employing deuterium oxide or heavy water carrier. It will be obvious, however, as this description proceeds, that the off-gas system of the invention can be adapted with equal facility to other types of neutronic reactors.

In view of the foregoing, an object of the present invention is the provision of a novel and efficient off-gas system adapated for use with a nuclear power plant.

Another object of the invention is the provision of an improved adsorption bed system for use with a nuclear reactor.

A further object of the invention is to provide a method and means for cyclically operating the aforesaid adsorption beds in order to ensure optimum adsorption and decay of the fission gases conveyed from the nuclear reactor to the charcoal beds.

Another object of the invention is the provision of a cyclically operated series of adsorption tanks or beds for radioactive gases in combination with holding and cooling means to permit at least partial decay of the gases, whereby the amount of radioactive gases adsorbed in the tanks is minimized.

Still another object of the invention is to provide a gaseous fission product elimination system which is adapted for use with a nuclear reactor plant and which is capable of holding up elimination of these gases in order to permit radioactive decay thereof to acceptable energy levels before venting these gases to the atmosphere.

These and other objects, features and advantages of the invention will be made apparent during the forthcoming description of illustrative forms of the invention, with the description being taken in conjunction with the accompanying drawings wherein:

FIGURE 1 is a schematic and elevational view, partially sectioned, of one form of reactor vessel adapted for use with a homogeneous or quasi-homogeneous reactor and shown in conjunction with primary coolant loop circuitry.

FIG. 2 is a schematic fluid circuit diagram of the homogeneous reactor system illustrated in FIG. 1 as arranged in connection with certain auxiliary equipment;

Figure 3A:
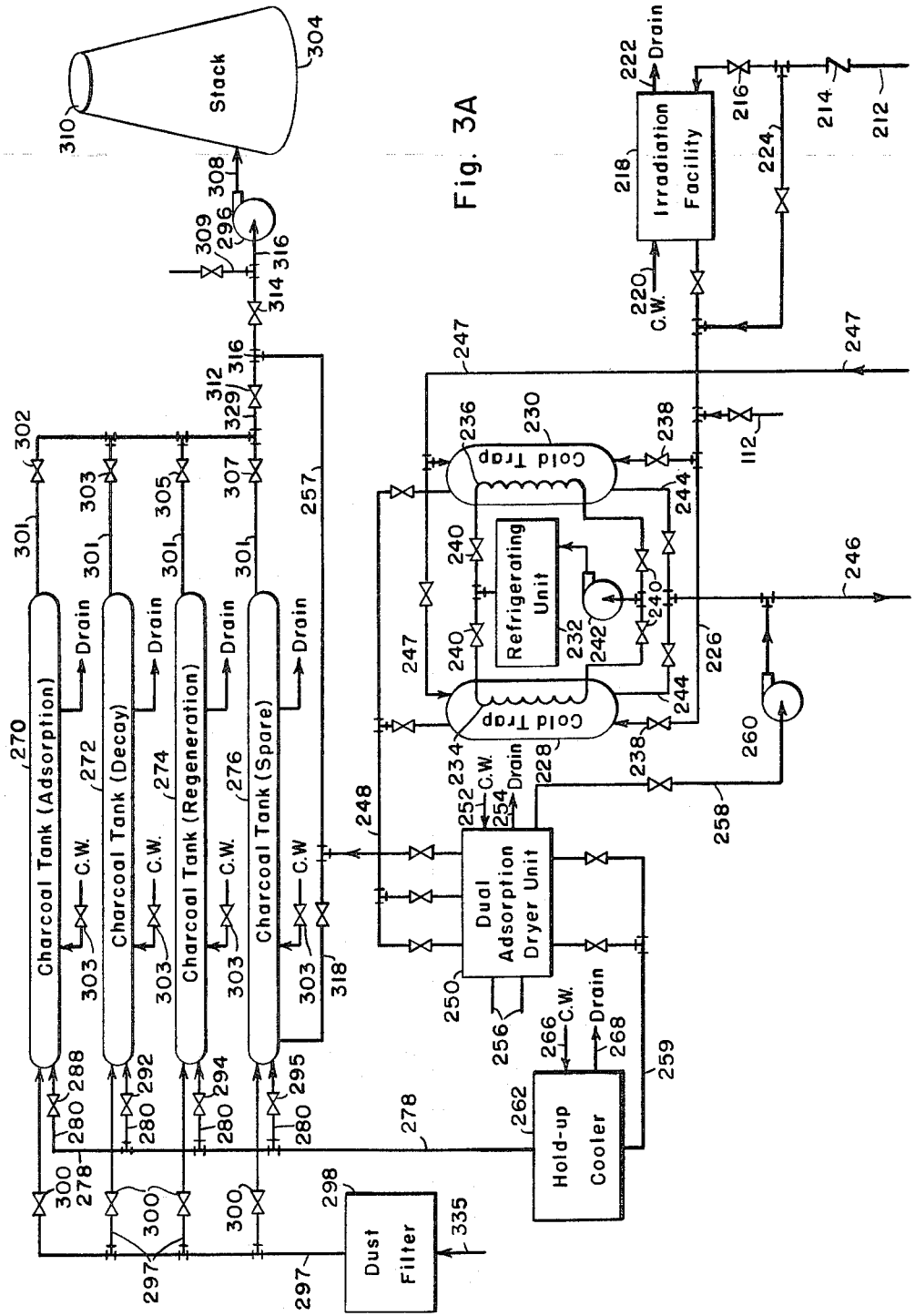
FIGS. 3A and 3B depict a schematic fluid circuit diagram of a gaseous fission product elimination system, which depicts in greater detail the gas handling system denoted generally by the reference characters 78, 80 and 90 of FIG. 2.
Figure 3B:
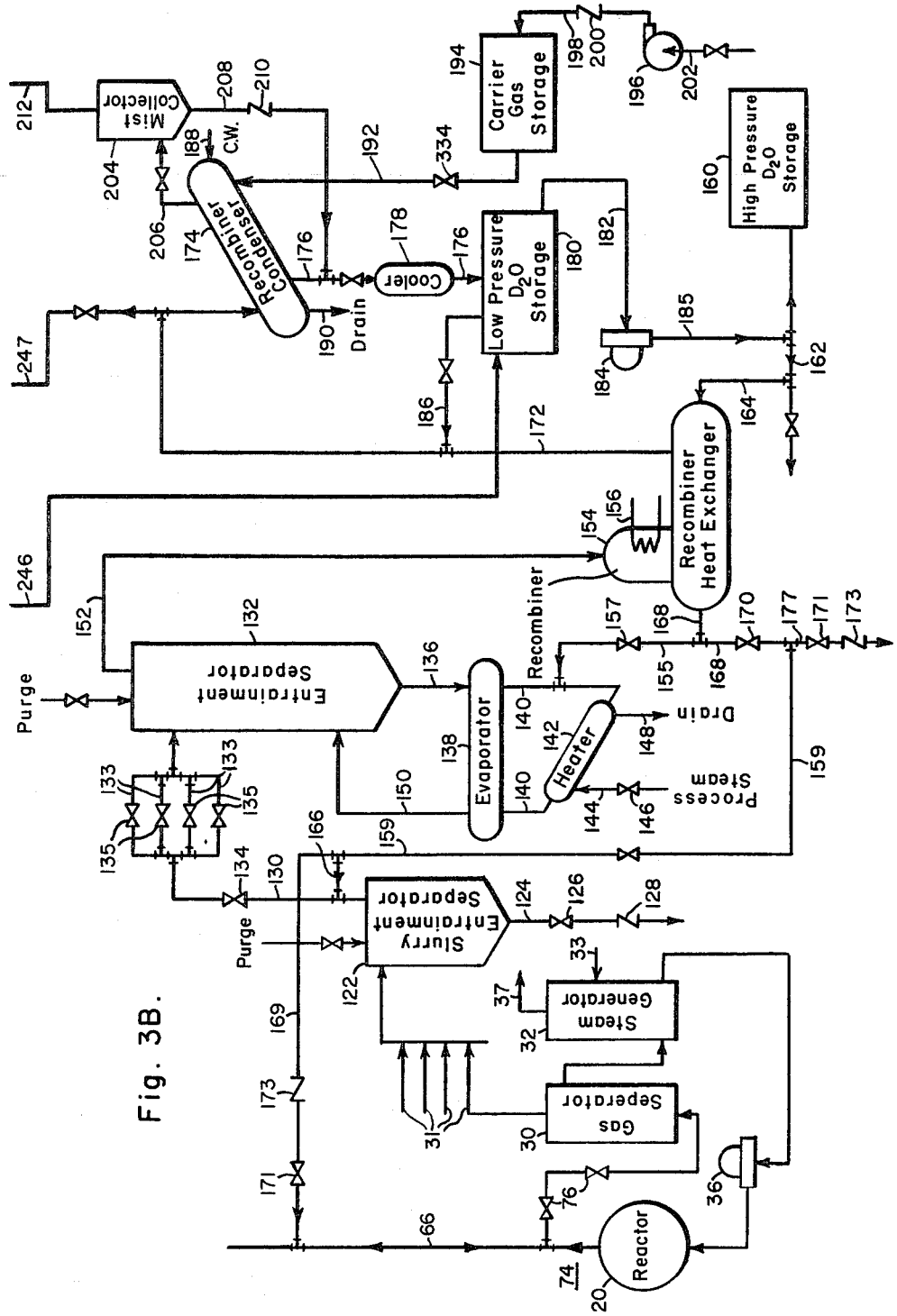
Figure 4:
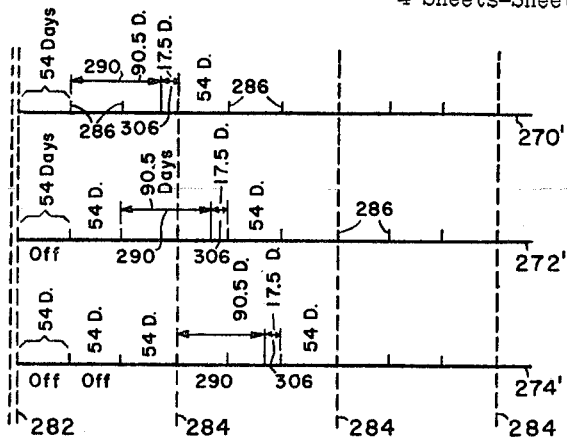
Figure 5:
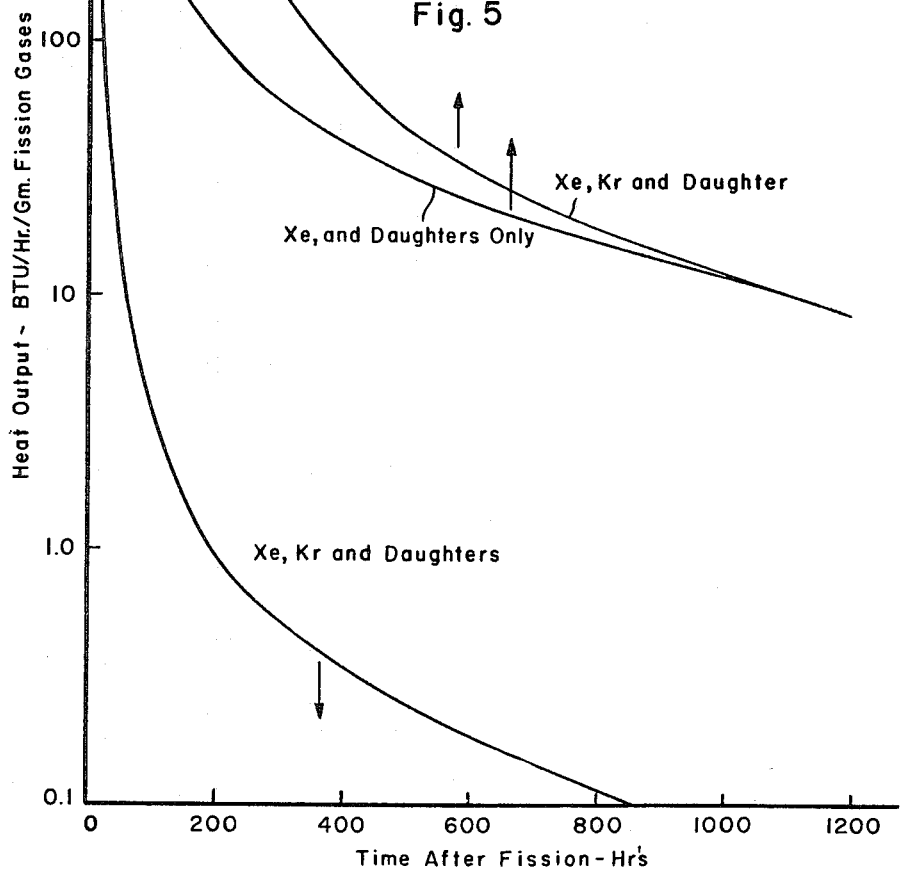

FIG. 4 is a graphical representation showing one method of operating the charcoal beds illustrated in FIG. 3 in order to obtain optimum conditions of decay and adsorption of fission gases when the off-gas system of FIG. 3 is employed in conjunction wtih the reactor system described hereinafter more fully; and FIG. 5 is a graph showing the heat of radioactive decay of various gaseous fission products as plotted against time after fission.

Generally speaking, in a homogeneous-type reactor system, the nuclear fuel is contained within the system as a liquid or suspension which in some cases may be a liquid compound of at least one of the fissile isotopes noted below. In other cases, the liquid fuel comprises a suspension in a suitable vehicle of a pulverulent form of one or more of these fissionable and fertile isotopes, or combination thereof, of a solution of at least one of these components. In those systems wherein the fuel is employed as a suspension or slurry, the reactor system is sometimes designated as quasi-homogeneous. As explained more thoroughly hereinafter, the liquid fuel is circulated through a reactor vessel by one or more primary circulating loops provided with suitable pumping means. The liquid fuel including the vehicle or solvent, which desirably serves both as coolant and moderator, thus circulates through both the vessel and the circulating loops in contradistinction to a heterogeneous type reactor system. In the latter class of reactors the fuel, moderator, and the coolant or coolant-moderator usually are physically separated and at least the fuel is contained in solid form entirely within the reactor vessel.

The homogeneous reactor vessel is fabricated of such size and shape that a quantity of the circulating liquid fuel contained therein is equivalent to the critical mass of the chain reacting isotope contained in the fuel and consequently a self-sustaining chain reaction can be established in the vessel. In the case of a quasi-homogeneous reactor, the concentration of the fissionable or chain-reacting isotope in the slurry or suspension can be adjusted within rather wide limits such that the aforesaid size and shape of the vessel can be varied accordingly as desired. As pointed out hereinafter, the remaining components of the system are insufficient in size and are suitably spaced or shielded such that a critical mass cannot be accumulated elsewhere in the reactor system. The heat developed within the circulating fuel as a result of the nuclear chain reaction is removed from the fuel as it circulates through the primary loops by suitable heat exchanging means coupled within each of these loops.

The vehicle or solvent employed with the circulating fuel, which may be ordinary water ($H_2O$), heavy water ($D_2O$) or an organic material having the desired characteristics of temperature and radiation stability, serves as a moderator for the chain reaction in addition to serving as a heat transfer medium as noted heretofore. As is well known, a moderator material usually is employed in a thermal reactor adjacent the nuclear fuel to slow the fast neutrons produced by each fission to thermal velocity, wherein the neutrons are most efficient for inducing fission in atoms comprising the fissionable isotopes. More specifically, the moderator material slows neutrons having energies in the neighborhood of ten million electron volts to energies which are equivalent to thermally excited hydrogen atoms or about 0.1 electron volt. As a result, the moderator material appropriately is selected from a material having the characteristics of low neutronic capture cross-section and a high neutronic scattering cross-section. Suitable materials for these purposes include carbon and the vehicle or solvents noted heretofore, i.e., light and heavy water, and hydrocarbon organic materials which, of course, contain carbon and hydrogen.

The homogeneous reactor system, presently to be described, is controlled inherently by the negative temperature coefficient of reactivity associated with the circulating nuclear fuel. This phenomenon is comparatively well known and is based upon the fact that an increase in temperature of the fuel contained within the reactor vessel decreases the density of the vehicular moderator and likewise its moderating characteristics. By the same token, this decrease in density increases the number of peripheral neutrons lost from the chain reacting mass and accordingly lowers the number of neutrons available for sustaining the chain reaction. Additional control is accomplished, as required, by diluting the circular fuel with additional vehicle or solvent, by adding a neutron absorbing poison such as cadmium or boron, or by draining the contents of the reactional vessel into a series of storage tanks presently to be described. The latter arrangement also serves to terminate the chain-reaction completely in an emergency or to shut down the reactor for maintenance and the like.

The fission products which are formed during operation of the reactor must be extracted continually from the system by means of chemical processing in the case of solids or, in the case of gases, by means of an off-gas system such as that forming the subject of the present invention. These fission products cannot be permitted to accumulate within the reactor system inasmuch as some of the isotopes, particularly xenon 135, eventually terminate or poison the chain reaction although present in relatively small concentrations. In any event, the accumulation of these isotopes which result either directly, or indirectly through radioactive decay, from the fission process would in time greatly increase that radioactivity necessarily associated with the reactor plant even though the fission products are removed continuously. As a result, the normal biological shielding requirements would be greatly increased. Moreover, many of fission-produced isotopes are valuable per se for those research, industrial, and medicinal applications which demand a high level of various radioactive emanations.

The circulating nuclear fuel in a "simple burner" type homogeneous reactor, contains primarily one or more of the known fissionable isotopes $_{92}U^{233}$, $_{92}U^{235}$, or $_{94}Pu^{235}$. The latter isotope can be fissioned efficiently only by fast neutrons and therefore does not require a moderator. However, in "regenerative" or "breeder" types of homogeneous reactors, an additional quantity of a fertile isotope such as $_{90}Th^{232}$ or $_{92}U^{238}$ is mixed with the circulating fuel material. The latter fertile isotope can be supplied in the form of natural or source grade uranium which is primarily the $U^{238}$ isotope admixed with approximately 0.7% of $U^{235}$. In a heterogeneous type reactor, the same combinations of fissionable and fertile isotopes can be employed, with the exception that both groups of the fissile isotopes are fixedly mounted within the reactor core and that the fertile isotope, commonly referred to as "blanket" material, usually surrounds the fissionable material. However, in a uniform, low enrichment heterogeneous reactor, several designs of which are either extant or under consideration, the so-called blanket or fertile material, of course, is mixed uniformly with the fissionable isotope. In the latter class of reactors, $U^{238}$ usually is employed which has been enriched to a greater than natural percentage of $U^{235}$. In an efficient reactor of the previously-mentioned regenerative types, it is possible to generate from the one or more fertile isotopes at least as much fissionable isotopes as is consumed in the chain reaction. If the conversion ratio is greater than unity, the reactor is classified in the breeder category.

During the progress of the chain reaction, each fissioned atom emits an average of two to three neutrons. Approximately one of these neutrons is utilized in propagating the chain reaction. Another one of the neutrons is employed to initiate one of the series of nuclear reactions described below, whereby an atom of the fertile or blanket material is transmuted into fissionable isotope equivalent, for example, to the amount of fissionable material consumed in the chain reaction. If such is the case, only fertile material need be added to the homogeneous reactor system during its operation. The remainder of the fission-produced neutrons are adsorbed in structural and moderator materials and in non-fissioning capture by atoms of fissile material or are lost from the periphery of the chain reacting mass.

Upon capturing one of the aforesaid neutrons the fertile material $_{92}U^{238}$, if employed, is converted into the transuranic element, plutonium $_{94}Pu^{239}$, in accordance with the following nuclear equations:

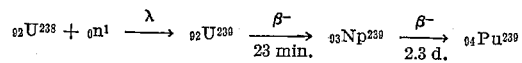

with the times denoted at the latter two reactions being the half-lives of the decaying isotopes. The transuranic isotope $_{92}Pu^{239}$, which is one of the aforesaid fissionable isotopes, is endowed with a half-life of 24,000 years and thus is relatively stable.

On the other hand, the artificial, fissionable isotope $_{92}U^{233}$ is obtained when thorium 232 is employed as the fertile or blanket material. The $U^{233}$ isotope is formed as a result of the following series of nuclear reactions:

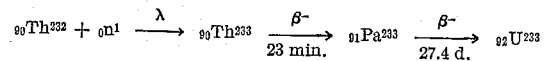

The resultant fissionable isotope $U^{233}$, having a half-life of 163,000 years, likewise is relatively stable.

Referring more specifically to FIGS. 1 and 2 of the drawings, the homogeneous reactor system illustrated comprises a reactor vessel 20 having a spheroidal configuration and provided at diametrically opposite areas thereof with inlet and outlet manifolds 22 and 24 respectively. The reactor vessel 20 is of sufficient size to contain as aforesaid a critical mass of the circulating nuclear fuel flowing through the vessel and the primary loops of the reactor system. In this application, wherein a circulating slurry containing suspended pulverulent oxides of thorium ($ThO_2$) and highly enriched uranium ($UO_2$) is employed, with a vehicle including deuterium oxide or heavy water ($D_2O$), the inside diameter of the innermost reactor vessel thermal shield 40 is of the order of 13 feet. The aforementioned slurry thus includes a fissionable material in the form of uranium 235 and a fertile material, thorium 232. Additionally, a small proportion of the fertile material, uranium 238, is included unavoidably with the U²³⁵ isotope.

In this example of the homogeneous reactor system, a total of four circulating loops are connected to the intake and outlet manifolds 22 and 24 by means of inlet and outlet conduits 26 and 28, respectively. The outlet conduit 28 is connected to a gas separator 30 which in turn is coupled in series with a steam generating heat exchanger 32 coupled through a conduit 35 to the suctional side 34 of a primary slurry pump 36. The gas separator 30 is conventional in construction and is arranged to remove fissional and radiolytic gases from the system which gases are conducted out of the separator by means of a conduit 31. The steam generator 32 which is provided inter alia with a feed water inlet 33 and a steam outlet conduit 37 is fabricated in a form such as that described in a copending application of William A. Webb et al., entitled "Remote Equipment Maintenance," Serial No. 659,002, filed May 15, 1957, now abandoned, and assigned to the present assignee. The discharge side of the pump 36 is coupled to the intake conduit 26 and manifold 22 of the reactor vessel.

In this example, the reactor vessel 20 is formed from a plurality of spheroidal sections 38 which are welded together as shown to form the completed vessel. In order to minimize thermal stresses within the walls of the vessels 20, which are of the order of six and one-half inches in thickness, a plurality of thermal shields, indicated generally by the reference character 40, are disposed adjacent the inner surface of the reactor vessel walls. The thermal shields 40 conform generally to the inner configuration of the vessel walls and are spaced therefrom and from one another in order to provide, in this example, channels therebetween for passage of the circulating nuclear fuel. Inasmuch as the thermal shields 40 are subjected to little or no pressure differentials, they are made relatively thinner with respect to the vessel walls 20. A plurality of baffles 42 are disposed adjacent the lower or intake manifold 22 and are suitably shaped for distributing the incoming slurry as indicated by flow arrows 44 throughout the interior areas of the vessel 20 and for diverting a peripheral portion of this flow through the passages formed between the thermal shields 40 and adjacent the inner wall of the vessel 20. A neutron reflecting member (not shown) can be disposed adjacent the thermal shields to reflect peripheral neutrons back into the central region of the vessel 20 in order to improve the neutron economy of the chain reaction.

The disposition of the thermal shields 40 in this manner substantially prevents impingement of fission-neutrons upon the adjacent vessel walls. Accordingly, the heating effect of the impinging neutrons is developed almost entirely within the thermal shields 40 which are not subject to pressure stresses as are the walls of the pressurized vessel 20. Moreover, the heat developed within the thermal shields 40 is readily removed by that portion of the circulating fuel flowing through the channels therebetween. Alternatively, the thermal shields 40 can be replaced by the shield arrangement (not shown) disclosed and claimed in a copending application of W. P. Haass, entitled "Reactional Vessel," Serial No. 652,627, filed April 12, 1957 and assigned to the present assignee.

The pressurized reactional vessel 20 is mounted upon an annular supporting collar indicated generally by the reference character 46 and mounted upon a biological shielding wall portion or support 48. This mounting arrangement for the reactor vessel 20 and the physical distribution of the primary circulating loops and other equipment associated therewith are described in greater detail in the copending application of W. A. Webb et al., entitled "Reactor Plant," Serial No. 659,004, filed May 14, 1957, and assigned to the assignee of the present application.

In order to drain the reactor vessel, a drain outlet 50 disposed in the lower or intake manifold 22 is coupled to a series of slurry drain tanks 52, through a conduit 54. When it is desired to fill the reactor system, the slurry contained in the drain tanks 52 is returned through another conduit 56 which is coupled to one or more of the circulating loop conduits 26. To aid in filling the reactional vessel and associated loops, an auxiliary slurry pump 58 is coupled into the conduit 56. The physical disposition of the drain tanks 52 relative to the nuclear power plant layout arrangement is described in greater detail in the last-mentioned copending application. For the present, it may be pointed out that the drain tanks 52 are provided in sufficient number to contain all of the circulating nuclear fuel slurry of the system but are of such size that none of the tanks can contain a critical mass of slurry. Suitable neutron-absorbing material (not shown) is disposed between adjacent tanks in order to prevent the development of a chain reaction within the collective group of tanks when they are filled with the circulating fuel.

In one exemplary arrangement, the fluid fuel contained within each of the drain tanks 52 is stirred constantly by individual agitators or stirrers 59 mounted adjacent the top of each of the tanks 52 and extending to the bottoms thereof to prevent settling of slurry particles. The tanks 52 and the agitators 59 desirably are hermetically sealed to prevent leakage of biologically hazardous fluid and desirably are provided in the form disclosed and claimed in a copending application of Mei and Widmer, entitled "Sealed Agitator," Serial No. 672,661, filed July 18, 1957, now Patent 2,907,556, and assigned to the present assignee.

The upper or outlet header 24 is fitted with an additional port 60 to which a surge tank 62 is coupled by means of a conduit 66. In one form of homogeneous reactor system, the surge tank 62 comprises a relatively large volume which, however, is insufficient to contain a critical mass of the circulating fuel. When in operation, a vapor space 68 is formed in the surge tank, which conveniently contains a vapor of the vehicle employed in suspending the aforementioned fissionable and fertile oxides. As a result, during a positive system transient within the homogeneous reactor system, a surge of liquid into the tank 62 compresses the vapor confined within the surge tank space 68, thereby relieving at least partially the increased pressures developed with the system.

A pressurizing vessel 64, which is coupled to the tank 62 by a conduit 67 connecting the vapor space thereof, is furnished with a number of heating elements, indicated generally by the reference characters 70 and arranged for heating a portion of liquid, desirably the same as the aforementioned liquid vehicle of the system. Thus, the reactor system is maintained at the desired operating pressure, by vaporization and expansion of the aforesaid vehicle portion. The pressurizing vessel 64 is provided with an inlet conduit 72 whereby the vessel is initially charged with the aforesaid vehicle portion and make-up vehicle is added to the pressurizing vessel as required. This make-up vehicle is necessitated by radiolytic decompositon of the vehicle within the system and the incomplete recombination of the component gases of the vehicle.

Alternatively, the pressurizing vessel 64 and the surge tank 62 can be replaced by the pressure regulating system claimed and disclosed in the copending application of Jules Wainrib, entitled "Pressure Controlling System," Serial No. 677,942, filed August 13, 1957 now U.S. Patent 3,060,110, and assigned to the present assignee.

Referring now more particularly to FIG. 2 of the drawings, various auxiliary equipment associated with the aforedescribed homogeneous reactor system, is illustrated schematically therein. In the arrangement of the homogeneous reactor system, illustrated in FIG. 2, the primary slurry pump 36 is furnished with a capacity of approximately 8,000 gallons per minute which in conjunction with three other primary slurry pumps (not shown) disposed in a like number of similar circulating loop systems indicated generally by arrows 74, produces a total rate of flow of approximately 32,000 gallons per minute. Inasmuch as the reactor vessel 20 and the circulating loops together enclose a total volume of approximately 19,000 gallons, the circulating fuel is recycled through the system in about one-half minute.

In this application of the invention, the circulating slurry comprises a vehicle of deuterium oxide ($D_2O$) in which is suspended about 300 grams of thorium oxide ($ThO_2$) and approximately ten grams of uranium ($UO_2$) per kilogram of $D_2O$. The uranium is "fully enriched" and contains upwards of 90% of $U^{235}$ isotope. Added with the uranium oxide is a very small proportion of a palladium catalyst employed to promote in this example internal recombination of the major proportion of the radiolytic vehicle gases deuterium and oxygen. The uncombined or remaining radiolytic gases are employed to sweep fission product gases out of the system, as explained hereinafter. The quantity of palladium catalyst, which is added in the form of the oxide (PdO), is of the order of 0.001 gram per liter of slurry, and can be replaced by another suitable catalyst, such as a platinum compound.

Accordingly, the system circulates a mixed oxide slurry with a total oxide concentration in excess of 300 grams per kilogram of $D_2O$ which corresponds to a solids content of about 3% by volume. The reactional vessel 20 and the circulating loops 74 are maintained under a pressure in the neighborhood of 2,000 pounds per square inch absolute by operation of the pressurizing vessel 64. The pressurizing vessel 64, which desirably contains only deuterium oxide, or other such vehicle, employed in the homogeneous system as noted heretofore, is separated from the liquid or slurry portion of the surge 62 by means of the steam space 68 thereof, to which the conduit 67 is coupled, thus avoiding the caking that would result if the circulating slurry itself were boiled in the pressurizing vessel 64.

Leaving the reactor vessel the slurry stream branches into four parallel identical circulating loops 74 only one of which is illustrated in detail. If desired, each loop can be isolated from the reactor by providing two pairs of dual stop valves 76 to permit certain types of remote or semi-direct maintenance to be performed on one of the circulating loops without shutting down the entire plant. Such maintenance can be performed, for example, in the manner described in the aforesaid copending application of McGrath et al., Serial No. 659,003, and in a copending application of Webb et al., Serial No. 659,002, filed May 14, 1957, now abandoned, entitled "Remote Equipment Maintenance" and also assigned to the present assignee.

Within the reactor vessel, part of the kinetic energy of the fission fragments is absorbed by the deuterium oxide molecules some of which are dissociated into deuterium and oxygen gases which are for the most part recombined within the reactor system through use of the palladium catalyst noted above. However, the remaining portion of these radiolytic gases is recombined by means of an external recombination unit, indicated generally by the reference character 78 and described in greater detail in connection with FIG. 3 of the drawings wherein the gases are recombined through the use of a suitable external catalytic agent, such as platinum. The unit 78 is coupled through a conduit 79 to the outlet of a gas letdown or depressurizing device 80, which in turn is connected to the conduits 31 of the gas separators 30. In this arrangement, the depressurizing device is adapted for handling the gases extracted from the primary loops by the gas separators 30. The slurry entrained in the gas separator output is separated before reaching the depressurizing device by equipment associated therewith and described in greater detail in connection with FIGS. 3A and 3B, and is returned to the suctional side of the primary slurry pump 36 by means of a conduit 82. The pure deuterium oxide compounded from the radiolytic gaseous components thereof at the recombining unit is conducted from the unit through outlet 84 and suitable conduits to the primary slurry pumps 36, the auxiliary pump 58 and valves 76 for purging purposes and other applications described hereinafter. The total deuterium oxide formed in the recombining unit, is in the neighborhood of 1,600 pounds per hour, at full power and assuming also 90% internal recombination by means of the aforesaid palladium catalyst. A portion of this output is added to the pressurizing vessel 64 by means of its feed water inlet 72. The pressurizing vessel feed water or make-up vehicle is in the order of 100 pounds per hour of deuterium oxide.

The uncondensed gases issuing from the recombination unit 78 through a conduit 88 are delivered to an off-gas system 90 whereat a quantity of a suitable vehicle, such as ventilation air taken from the reactor plant arrangement presently to be described, is mixed with the radioactive uncondensed gases in order to dilute these gases, for example, the longer-lived radio isotopes of krypton and xenon, before venting the same to the surrounding atmosphere. Before mixing with the ventilation air, these gases are held up in charcoal beds, presently to be described, until their radioactivity has decayed to a minimum value. Any deuterium oxide which is recovered in the off-gas system 90 is returned through a conduit 92 to the recombination unit 78 where it is combined with the deuterium oxide output thereof.

A very small and not necessarily constant stream on the order averaging 18 pounds per hour is bled from one of the primary circulating loops 74 and is conducted through a conduit 94 to a slurry-letdown or depressurizing arrangement 96. In the slurry-letdown system, a substantial amount of system pressure is removed from the slurry and at the same time it is cooled to prevent flashing. The letdown device comprises a length of small diameter coiled tubing (not shown) or other pressure dropping device, immersed for example in a tank of coolant fluid. The slurry is then concentrated by evaporation or settling and the vehicle or diluted slurry is returned to the suctional side of the primary slurry pump 36 by means of a conduit 98. The conduit 98 desirably joins the outlet conduit 56 of a slurry draining and filling system, indicated schematically at 100, and thus is returned to the primary circulating loop by means of the auxiliary slurry pump 58. For purposes of initially filling the reactor system, the auxiliary slurry pump and conduit 56 are bypassed by a conduit 102 connecting the drain tanks 52 (FIG. 1) of the slurry handling system 100 directly to the suctional side of the primary pump 36 whereby, in this example, the latter pump can draw the homogeneous reactor fuel directly from the drain tanks 52.

The concentrated slurry output of the slurry letdown system which is now maintained at a lower pressure suitable for chemical processing is conducted through a conduit 104 to a chemical processing plant 106 which is arranged exteriorly of the vapor container (not shown) associated with the nuclear power plant, but nevertheless, is integrated therewith. In the chemical processing plant, the fission products are removed and the reprocessed slurry is returned to one of the primary circulating loops through an outlet conduit 108, the conduits 98 and 56, and the auxiliary slurry pump 58. The liquid and solid wastes separated from the concentrated slurry are conveyed through a conduit 111 to suitable storage chambers to await sufficient decay thereof in the case of short-lived radioactive materials or for underground or oceanic burial in the case of long-lived materials. Additional fertile material is added to the reactor system by means of a conduit 110, whereby the material desirably is mixed with the reprocessed slurry. Another conduit 112 is provided for conducting radioactive gaseous materials separated in the chemical processing plant to the off-gas system 90. These gaseous materials, of course, consist of residual fission product gases which were not removed by the gas separators 30 for subsequent treatment in the gas handling system presently to be described.

In the operation of the homogeneous reactor system, approximately 19,000,000 pounds per hour of the circulating nuclear fuel suspension or slurry enters the reactor vessel 20 at a temperature of approximately 465° F. As the chain reaction proceeds within the reactor vessel 20, with the deuterium oxide vehicle of the slurry acting as a moderator therefor, the temperature of the circulating fuel issuing from the top or outlet manifold 24 of the vessel is increased to 580° F., at maximum power output. With the arrangement shown, approximately 550 megawatts of heat are developed by the reactor system of which, in one application, approximately 25 percent is converted to electrical energy by a suitable thermodynamic arrangement (not shown). As explained heretofore, the circulating fuel is divided into four streams which are conducted respectively to the four steam generators 32 where the heat developed in the reactor vessel is given up to ordinary water maintained in the steam side of the generator to form a total of approximately 2,000,000 pounds per hour of steam at a pressure in the neighborhood of 400 pounds per square inch absolute. This output from the four steam generators is conducted, for an example, to a turbine (not shown) through the steam outlet conduits 37 from which turbine the spent steam or condensate is returned through the feed water inlets 33 to the individual steam generators.

Referring now to FIGS. 3A and 3B of the drawings, the gas letdown system 80, the recombiner 78 and the off-gas system 90 are illustrated in greater detail. During operation of the reactor 20 the output from the four gas separators, represented in FIG. 3B by the reference character 30 and outlet lines 31, is conveyed to a slurry entrainment separator 122. For the reactor system illustrated in FIGS. 1 and 2, the composition tabulated below is conveyed to the slurry entrainment separator under substantially the conditions existing at the gas separator 30, that is to say at a pressure of 2,000 pounds per square inch absolute and a temperature of approximately 580° F. These conditions of temperature and pressure are those at which the reactor circulating loops described heretofore are operated. The following quantities are the anticipated maxima for design purposes and therefore are based upon full reactor power output and the absence of internal recombination of the radiolytic gases:

| Gas or other component: | Quantity per minute, pounds |
|---|---|
| $D_2$ | 54.4 |
| $O_2$ | 217.6 |
| Vaporized $D_2O$ | 1047 |
| Slurry | 2090 |
| Gaseous fission product | $3.7 \times 10^{-4}$ |

The slurry separated by means of the entrainment separator 122 is returned to the suction side 34 of a single one of the primary circulating loop pumps 36 (FIGS. 1 and 2), through a conduit 124, a control valve 126 and a check valve 128. The check valve 128 is furnished to prevent any reverse flow of primary slurry to the separator 122 in the event of pump failure. The remainder of the materials fed into the slurry entrainment separator 122 are conducted through conduit 130 to a second entrainment separator 132, with a flow regulating valve 134 being coupled in the conduit 130. The pressure of the output material of the slurry entrainment separator 122 is reduced from the reactor system operating pressure to 2,000 p.s.i.a. to 100 p.s.i.a. by means of the lines or conduits 133 and valves 135 which comprise a pressure letdown device. More specifically, this device includes a number of small diameter pipes 133 connected in parallel each having a control valve 135. Thus, the letdown device controls the flow to the recombiner 154 presently to be described and reduces the pressure of the slurry entrainment separator output to that of the evaporator 138, or 100 p.s.i.a.

The liquid deuterium oxide vehicle, amounting to 944 pounds per minute, which is separated by the entrainment separator 132 is conveyed through a conduit 136 to an evaporator 138. The evaporator 138 is furnished with a heated bottom leg or conduit 140, with which is associated a heating element 142. Heat is supplied to the element 142 by means of process steam ($H_2O$) which is conducted thereto through a conduit 144 and valve 146. In this example, 1821 pounds per minute of the process steam is utilized, with the steam being supplied at 400° F. under a pressure of 250 p.s.i.a. The process steam condensate is then removed from the heating element 142 to a suitable drain by means of a conduit 148. The vaporized $D_2O$ steam which is produced within the evaporator 138 is conducted back to the entrainment separator 132 through a conduit 150. By this arrangement, the $D_2O$ steam serves as a diluent for the free deuterium and oxygen which leave the entrainment separator by means of an overhead conduit 152. This diluent is necessary in order to control the chemical reaction between the deuterium and oxygen which is subsequently carried out in a recombiner 154. An additional quantity of liquid $D_2O$ amounting to 1100 pounds per minute, is conveyed to the evaporator heating leg 140 through a conduit 155 and flow control valve 157. The latter portion of $D_2O$ likewise is converted to diluent steam in the evaporator 138 and is supplied thereto from the high pressure heavy water storage tank 160, in a manner presently to be described. Still another quantity of diluent $D_2O$ or 1267 pounds per minute is supplied to the output of the slurry entrainment separator 122 from the same source through the valved conduit 159. Each of these quantities of liquid $D_2O$ is furnished at a temperature and pressure of 580° F. and 2000 p.s.i.a., respectively. As a result of this dilution, the following quantity of material is supplied to the recombiner 154 during each minute of reactor operation: 54 pounds of deuterium, 218 pounds of oxygen, 3414 pounds of $D_2O$ vapor, and the quantity of fission product gases noted heretofore.

The recombiner 154 is provided with a start-up heater 156 which has an electrical capacity of about 34 kilowatts. After the chemical reaction between the deuterium and oxygen is initiated in the recombiner 154, the heat evolved by the reaction is removed by means of recombiner heat exchanger indicated schematically by the reference character 158. The heat of the deuterium-oxygen reaction is limited to about 1100° F. by means of the diluent $D_2O$ noted heretofore and by the heat exchanger 158. This heat is employed to heat high pressure deuterium oxide which is withdrawn from a high pressure $D_2O$ storage tank 160 through the conduits 162 and 164. 3641 pounds per minute of liquid $D_2O$ is supplied to the heat exchanger 158 at a pressure of 2000 p.s.i.a. and at a temperature corresponding to that of the high and low pressure storage tanks 160 and 180 or 210° F. In the heat exchanger 158, this quantity of $D_2O$ is raised to a temperature of 580° F. which, of course, is not sufficient to boil the $D_2O$ at this pressure. Portions of this $D_2O$ are then conveyed to the heating leg 140 of the evaporator 138 through the conduits 166 and 155, and to the slurry entrainment separator output conduit 130 through conduits 166, 168 and 159 as described above. A third portion, or 1273 pounds per minute of the recombiner heat exchanger 158 output is supplied to the surge line 66 (FIGS. 2 and 3B) through conduit 169 and flow control valve 171, whereby makeup $D_2O$ vehicle is added to the circulating loops 74 (FIG. 2). As indicated heretofore, all of the recombiner heat exchanger output (conduit 166) including the make-up vehicle, is maintained at 580° F. and 2000 p.s.i.a., which correspond to the temperature and pressure, respectively, of the slurry exiting from the reactor vessel 20 through the outlet conduits 28 (FIG. 1). A check valve 173 is coupled in the conduit 169 to prevent reverse or surge flow of slurry through this conduit.

A very small side steam is extracted from the conduit 169 and is conveyed through the feed water conduit 72 of the pressurizer 64 (FIGS. 1 and 2) where it serves as make-up for the pressurizing vessel 64. Thus, the pressurizer make-up likewise is delivered at a temperature of 580° F. and 2000 p.s.i.a., which are the reactor vessel output operating conditions, and a valve 175 in the conduit 168 is adjusted in this example to permit a flow of 1.4 pounds per minute of liquid D$_2$O in order to maintain a constant water level in the pressurizer 64.

The gases and vapor issuing from the other side of the recombining heat exchanger 158 at 40 p.s.i.a. and 280° F. are conveyed through a conduit 172 to a recombiner condenser 174. The material condensed in the recombiner condenser 174 is then conducted through a valved conduit 176 to a cooling unit 178 wherein the condensed D$_2$O is cooled sufficiently for introduction into a low pressure deuterium oxide storage tank 180. The liquid output of the condenser 174 exits at 35 p.s.i.a. and 260° F., but in the cooling unit 178 its temperature is lowered to 210° F. to prevent vapor binding of the high pumps 184. From the storage tank 180 the liquid deuterium oxide is conveyed through a conduit 182 to a system of high head pumps, one of which is indicated generally by the reference character 184. The pumping system 184 serves to increase the pressure of the deuterium oxide to the operating pressure of the reactor system or 2000 p.s.i.a. The output of the pumping system 184 is conveyed through a conduit 185 and the conduits 162 and 164, respectively, for storage in the high pressure tank 160 or for heating in the recombining heat exchanger 158 from which it is subsequently introduced into the reactor system as described heretofore. Any vapor developed in or conveyed to the low pressure deuterium oxide storage tank 180 is conducted through a valved conduit 186 for recirculation through the recombiner condenser 174 from which it is then returned through the conduit 176 and the cooler 178 in the manner described heretofore.

The gases withdrawn from the heat exchanger 158 through the conduit 172 are thus conveyed to the recombining condenser at a substantially lower temperature and pressure. For this reason, the aforementioned high head pumps 184 are coupled between the low pressure storage tank 180 and the high pressure storage tank 160. The liquid deuterium oxide removed from the recombiner condenser 174 through the conduit 176 has been further cooled to 260° F. and a corresponding pressure of 35 p.s.i.a. by the cooling water supplied to the condenser 174 through the conduits 188 and 190. In the cooler 178 the temperature is further lowered to the operating temperature of the storage tank 180 or 210° F. At this temperature, of course, the low pressure storage tank 180 can be maintained substantially at atmospheric pressure if desired, but in this example the liquid deuterium oxide is maintained at a pressure of about 35 p.s.i.a. within the low pressure tank 180 in order to avoid the possibility of vapor binding in the high head pumping system 184 when D$_2$O is pumped into either the reactor system or the high pressure storage tank 160, both of which are maintained at an operating pressure of about 2000 p.s.i.a.

A carrier gas, such as nitrogen, or helium is supplied to the recombiner condenser 174 through a valved conduit 192 from a carrier gas storage tank 194. The carrier gas is supplied to the storage tank 194 by means of a centrifugal pump or blower 196 through a conduit 198 and check valve 200. The pump 196 is thus employed to withdraw the carrier gas from suitable storage cylinder (not shown) through a suction conduit 202. The carrier gas which is supplied to the recombiner condenser 174 is employed to flush the uncondensed fission products and other gases out of the recombiner condenser 174 and subsequent components of the gas handling system.

The separation of non-condensible or noble gases from the deuterium oxide condensate in the recombiner condenser 174 is accomplished by tilting the recombiner condenser 174 so that the hot gases enter and the condensate leaves at the lower end. The non-condensed or noble gases collect in the upper end of the condenser 174 whence they are conveyed to the gas handling components presently to be described. This arrangement also minimizes the amount of xenon poison dissolved in the condensate leaving the condenser 174, which condensate eventually is added to the reactor system as make-up fluid in the manner described previously.

Additionally, a small amount of liquid droplets of deuterium oxide are likewise carried out of the condenser 174. The uncondensed gases, carrier gas, and the liquid droplets or mist are conducted to a mist collector or entrainment separator 204 through the valved conduit 206. The mist collector 204, together with the slurry entrainment separator 122 and the separator 132, are conventional in construction and desirably includes a cyclone separator or other contrifugal type separating means. The entrained deuterium oxide separated from the fissional gases in the mist collector 204 is conducted through an outlet conduit 208 and check valve 210 to the outlet conduit 176 of the recombiner condenser 174. Thus, the outputs of the mist collector and recombiner condenser are combined for cooling and storage in the cooling unit 178 and the low pressure tank 180 described heretofore.

After removal of the D$_2$O mist or liquid droplets, the gaseous output of the mist collector is conducted through a conduit 212 (FIGS. 3A and 3B), a check valve 214 (FIG. 3A), and a flow control valve 216 to an irradiation facility denoted generally by the reference character 218. The aforesaid mist collector gaseous output consists in this example, of 0.136 pound per minute of uncondensed D$_2$O, $3.7 \times 10^{-4}$ pounds per minute of gaseous fission products, and $8.33 \times 10^{-4}$ pounds per minute of the carrier gas and is exited at a temperature of 259° F. and a pressure of 35 p.s.i.a. The radiation facility 218 comprises an internal volume of 1370 cubic feet and thus provides a hold-up time which, due to the gas velocity and the volume of the radiation facility, is equivalent to 12 hours. This hold-up time in combination with that furnished by the holdup cooler presently to be described is sufficient to permit substantially complete decay of many of the short-lived fission product gases. The heat developed as a result of radioactive decay within the radiation facility 218 is suitably removed by cooling water supplied thereto by means of conduits 220 and 222. The irradiation facility 218 can be employed for irradiating food or for other industrial purposes, as desired. In the event that use of the irradiation facility 218 is not desired, the same can be bypassed by means of a valved conduit 224.

The output of the irradiation facility or of the mist collector, as the case may be, is conveyed through a conduit 226, in this example, to a pair of alternately-operated cold traps 228 and 230 (FIG. 3A). The cold traps 228 and 230 are refrigerated by means of a cooling unit 232 and associated respective cooling coils 234 and 236. Suitable valves 238 and 240 are provided in the inlet conduit 226 and in the cooling coil circuit respectively in order that one of the cold traps 228 or 230 can be isolated from the system as desired. A refrigerant is circulated through the cooling coils 234 and 236 and the unit 232 by means of a suitable compressor 242.

To regenerate or defrost the cold traps 228 and 230, a small portion of the steam leaving the recombiner heat exchanger 158 is bled off periodically through a valved conduit system 247 (FIGS. 3A and 3B) to the upper ends of the cold traps 228 and 230. The regenerating steam is then condensed while melting the ice during its passage down through the isolated cold trap 228 or 230. The liquid issuing from the cold traps 228 and 230 is conveyed through valved conduits 244 and conduit 246 to the low pressure storage tank 180. The liquid deuterium oxide thus reclaimed by the cold trap 228 or 230 and returned to the low pressure tank amounts to slightly less than the 0.136 pound per minute conveyed to the cold traps 228 and 230 and is conducted to the low pressure storage tank 180 at a pressure of 35 p.s.i.a. and at a temperature of 32° F.

The uncondensed gases are carried from the cold traps 228 and 230, at a pressure of 25 p.s.i.a. and a temperature of 32° F., through a valved overhead conduit 248 to a dual absorption drier unit 250. The dual absorption drier 250 is a conventional unit wherein any remaining deuterium oxide vapor is removed by means of silicate gel or the like. The heat of radioactive decay is removed and the steam evolved when the drier is regenerated is condensed by cooling water supplied to the adsorption drier by means of conduits 252 and 254 while the heat required to remove subsequently the absorbed $D_2O$ from the silica gel is supplied by means of 0.8 kilowatt electric heater (not shown) connected to the electric leads 256. The system pressure is removed for purposes of regeneration by venting the drier through a valved conduit 257 to the blower 296 and stack 304 presently to be described. The $D_2O$ removed by the absorption drier 250 is conducted through a valve outlet conduit 258 and a pump 260 to the conduit 246 and thence to the low pressure $D_2O$ storage tank 180.

The gaseous output of the dual absorption drier 250, with the valuable $D_2O$ vehicle now virtually removed completely, is conducted by means of a valved conduit 259 to a hold-up cooler 262, where the gases enter at a pressure and temperature of 20 p.s.i.a. and 32° F. The hold-up cooler 262 comprises, for example, a tank or a length of relatively large size pipe having sufficient volume to delay or hold up the fission product gases conducted thereto for approximately 36 hours. The total gaseous volume of the hold-up cooler required for this purpose is about 65 cubic feet. The hold-up cooler 262 is provided with sufficient water cooling, which is introduced through conduits 266 and 268 respectively to remove sufficient decay heat in order to maintain the effluent gases at a temperature of less than 122° F. and a pressure of 20 p.s.i.a. This temperature is selected for the operating temperature of the charcoal tanks presently to be described as the minimum temperature attainable with ordinary cooling water during the summer. Lower temperatures are practically attainable during the greater part of the year but these cannot be considered for designing purposes. It is desirable, however, to operate the hold-up cooler 262 at the lowest temperature possible under existing weather conditions, in order to secure maximum hold-up time for a given weight of influent gases to obtain a maximum adsorbing capacity in the charcoal tanks presently to be described.

As indicated heretofore, the reactor system described in FIGS. 1 and 2 of the drawings is adapted for operation with a total thermal output of approximately 550 megawatts, at which power lever a considerable proportion of the deuterium oxide vehicle is radiolytically dissociated. The aforesaid palladium catalyst induces internal recombination, in this arrangement, of approximately 90% of the radiolytically separated deuterium and oxygen gases, with the remaining 10% of the deuterium and oxygen gases being employed to sweep the gaseous fission products out of the primary reactor system. In the case of the aforedescribed quasi-homogeneous reactor employing a slurry with the composition described previously, the following gaseous fission products are released directly during one day of reactor operation:

TABLE I

Direct Yield Gaseous Fission Products Released During One Day of Reactor Operation

[Reactor Power=550 MW   10% External Recombination]

| Isotope | Half life | Total production yield, gm./day | Maximum activity (MEV or—) |
|---|---|---|---|
| $Kr^{82}$ | Stable | 1.2 | 0 |
| $Kr^{83}$ | Stable | 1.77 | 0 |
| | 1.9 h | | 0.032 |
| $Kr^{84}$ | Stable | 3.36 | 0 |
| $Kr^{85}$ | 10.4 yr | 0.26 | 0.67 |
| | 4.4 h | 0.875 | 0.83 |
| $Kr^{86}$ | Stable | 8.25 | 0 |
| $Kr^{87}$ | 78 m | 7.65 | 4.2 |
| $Kr^{88}$ | 2.8 h | 10.7 | 2.9 |
| $Kr^{89}$ | 3.2 m | 1.36 | 4.2 |
| $Kr^{90}$ | 33 s | 0.27 | 3.2 |
| $Kr^{91}$ | 10 s | 0.09 | 3.6 |
| $Xe^{131}$ | Stable | 16.6 | 0 |
| | 12 d | 0.17 | 0.164 |
| $Xe^{132}$ | Stable | 21.6 | 0 |
| $Xe^{133}$ | 5.27 d | 22.85 | 0.43 |
| | 2.3 d | 0.55 | 0.233 |
| $Xe^{134}$ | Stable | 24.85 | 0 |
| $Xe^{135}$ | 15 m., 9.2 h | 15.16 | 0.52 |
| | | | 1.16 |
| $Xe^{136}$ | Stable | 25.95 | 0 |
| $Xe^{137}$ | 3.5 m | 2.62 | 4.26 |
| $Xe^{138}$ | 17 m | 9.31 | 2.0 |
| $Xe^{139}$ | 41 s | 0.57 | 5.19 |
| $Xe^{140}$ | 16 s | 0.22 | 4.01 |
| Total Xe | | 140.18 | |
| Total Kr | | 35.78 | |

It may be pointed out that not all of the isotopes and isomers tabulated above result directly from the fission process. For an example, a radioisotope of iodine $I^{135}$, which is a solid, is produced directly upon fission of the $U^{233}$ or $U^{235}$ isotopes and then undergoes beta decay with a half-life of 6.7 hours to its daughter isotopes $Xenon^{135}$, which, of course, is a gaseous material.

The hold-up cooler 262 and the radiation facility 218 are designed as aforesaid to provide a total hold-up time of 48 hours. This time is sufficient to eliminate substantially all of the radioactivity due to the shorter-lived isotopes indicated in the foregoing Table I. Thus, it is seen from the following Table II that only three gaseous isotopes have intermediate or relatively long half-lives and have substantially activity remaining after a period of about 48 hours, namely, $Xe^{133}$, $Xe^{131}$, and $Kr^{85}$.

TABLE II

Energy Released by One Day's Production of Those Fission Products Found in Adsorption Beds as a Function of Time After Fission

| Isotopes | Energy released MEV/day×10⁻²³ | | | | |
|---|---|---|---|---|---|
| | 4 hrs. | 12 hrs. | 48 hrs. | 240 hrs. | 1,200 hrs. |
| $Kr^{83}$ | 0.00009 | | | | |
| $Kr^{88}$ and daughter | .419 | 0.0574 | 0.0000225 | | |
| $Kr^{87}$ | .0738 | .000209 | | | |
| $Kr^{85}$: | | | | | |
| 10.4 yr | .0000037 | .0000037 | .0000037 | 0.0000037 | 0.0000037 |
| 4.4 h | .0076 | .00041 | .0000012 | | |
| $Xe^{135}$: | | | | | |
| 15 m | .00068 | .000066 | .0000022 | | |
| 9.2 h | .0381 | .0214 | .00228 | | |
| $Xe^{133}$: | | | | | |
| 5.27 d | .0000289 | .0000289 | .0000173 | .0000081 | .0000043 |
| 2.3 d | .00282 | .00253 | .0009 | .000155 | |
| $Xe^{131}$ 12 d | .00003 | .000029 | .000024 | .0000168 | .0000018 |
| $Xe^{138}$ and daughter | .0342 | .000194 | | | |
| Total | .5757 | .08227 | .00347 | .00018 | .0000098 |
| Xe Total | .07519 | .02425 | .00344 | .00018 | .0000061 |

By proper hold-up of these fission gases, substantially all radioactivity except that due to $Kr^{85}$ can be removed. The removal of $Kr^{85}$ activity is of course not feasible due to its related half-life of 10.4 years. The charcoal bed adsorption system presently to be described is designed so that the total activity of the discharged xenon isotopes does not exceed 20 percent of the $Kr_{85}$ activity. The total activity discharged is thus limited to approximately 450 curies per day.

The xenon adsorption cycle according to the invention requires a minimum of three activated charcoal beds or tanks 270, 272 and 274, and an additional charcoal tank 276 is furnished as a spare. Each of the operating tanks 270, 272, and 274 is provided with sufficient capacity for adsorbing the xenon fission product gases produced during a period equal to one-half the total time required for both the operations of radioactive decay and of stripping. The effluent gases of the hold-up cooler 262, which have been cooled as aforesaid to 122° F., are conveyed at a pressure of 20 p.s.i.a. through a conduit 278 to a series of valved conduits 280 coupled respectively to the charcoal tanks 270, 272, 274 and 276. The gases exit from the tank, being operated on the adsorbing portion of its cycle, at substantially atmospheric pressure and the pressure drop of about five p.s.i.a. serves to force the gases therethrough.

At the end of the long hold-up time required, the only significant activities are those due to $Xe_{131}$ and $Kr_{85}$. One may therefore analytically determine the optimum relationship between the stripping period and the time required for the decay portion of the cycle.

Let $t_1$ = length of stripping portion of cycle (days),
$t_2$ = length of decay portion of cycle (days), then, $t_1 + t_2 = K_3$ (a constant)
$N_0$ = No. of atoms of $Xe_{131}$ present on bed at beginning of decay period,
$N_f$ = No. of atoms of $Xe_{131}$ present on bed at end of decay period,
$\lambda$ = decay constant At the end of the decay period $$N_f = N_0 e^{-\lambda t_2} \quad (1)$$

Now it is assumed that the absorbed xenon, which is nearly all stable isotopes at the end of the decay period, is discharged throughout the stripping period at a constant rate. The maximum rate of activity discharged during stripping is therefore $$\frac{N_f}{t_1} = \frac{N_0 e^{-\lambda t_2}}{t_1} = \frac{N_0 e^{-\lambda t_2}}{K_3 - t_2} \quad (2)$$

Differentiating this expression with respect to $t_1$ and setting the derivative equal to zero, those values of $t_2$ and $t_1$ which minimize the activity discharged are obtained:

$$t_2 = K_3 - \frac{1}{\lambda} \quad (3)$$

$$t_1 = K_3 - t_2 = \frac{1}{\lambda} = 17.3 \text{ days (for } Xe_{131}) \quad (4)$$

Using this relationship, the decay period required to reduce the $XE_{131}$ activity to 20% of $Kr_{85}$ activity, is determined. The 20% figure is small enough so that the $XE_{131}$ does not make a large contribution to the total activity, yet large enough so that an excessively large adsorption bed is not required.

Allowable $Xe_{131}$ activity = 89.3 curies/day = $2.9 \times 10^{17}$ disintegration day/day $$2.9 \times 10^{17} = \lambda N_a \quad (5)$$

$$N_a = 5 \times 10^{18} \quad (6)$$

where $N_a$ = maximum number of atoms of $Xe_{131}$ discharged through stack per day.

Now the total number of atoms of $Xe_{131}$ present on the adsorption bed at the end of the decay period is given by $N_a$ multiplied by the time of stripping so that $$N_f = (5 \times 10^{18}) t_1 \quad (7)$$

Combining the Equations 1 and 7

$$5 t_1 \times 10^{18} = N_0 e^{-\lambda t_2} \quad (8)$$

but $$N_0 = .134 \times 10^{23}(1 - e^{-\lambda t_3}) \quad (9)$$

where $t_3$ = adsorption time.

$$5(17.3) \times 10^{18} = .134 \times 10^{23}(1 - e^{-0.0577 t_3})(e^{-\lambda t_2}) \quad (10)$$

Equation 10 may be solved for $t_2$ since $(1 - e^{-0.0577 t_3}) \doteq 1$; $t_2 = 89.3$ days; $t_3$ = adsorption time $$= \frac{t_1 + t_2}{2} = 53.3 \text{ days}$$

$$(11)$$

The total adsorption time shown by Equation 11, or about 54 days illustrates the optimum condition for operation of the charcoal bed arrangement to permit adequate adsorption and decay of the radioactive xenon isotopes.

In order to determine the maximum heat removal requirements in the fission product adsorption tanks 270, 272 and 274, an estimate has been made of the decay heat of Xe, Kr and their daughters. If the gases are held up for more than four hours or more before entering the adsorption tanks, those fission product decay chains where the direct product of fission has a half life of five minutes or less may be ignored for purposes of these calculations. Of the remaining gaseous isotopes, only the parent and the first daughter are considered.

The energy emitted per day by a direct product of fission is calculated by:

$$E = \epsilon \lambda A_0 e^{\lambda t} \quad (12)$$

where $E$ = Energy emitted in MEV/day
$t$ = time in hours after fission
$\epsilon$ = average energy per distintegration
$A_0$ = number of atoms released into gas stream per day (at 10% external recombination)

The energy emitted per day by a daughter isotope is obtained from:

$$E = \epsilon \left(\frac{\lambda_B \lambda_A}{\lambda_B - \lambda_A}\right) A_0 (e^{-\lambda_A t} - e^{-\lambda_B t}) \quad (13)$$

where the subscript A refers to the parent isotope and B to the daughter isotope.

The contributions of the various fission products as a function of time after fission, are given in Table II.

These data have been converted to terms of b.t.u./hr. per gram of fission products and are plotted in FIGURE 5 of the drawings. The data have been employed in calculating the quantity of cooling water required for the radiation facility 218, the hold-up cooler 262, and of the charcoal tanks 270, 272, and 274 throughout the various portions of their operating cycle. In the latter case, assuming that charcoal tank 270 is being operated during the adsorption portion of its cycle approximately 4130 B.t.u. per minute of heat must be removed therefrom. Thus, in the decay portion of the cycle as represented by tank 272 the average rate at which heat must be removed is 284 B.t.u. per minute, and during the regeneration portion of the cycle represented by tank 274, an average of 140 B.t.u. per minute is generated, which is employed to maintain the latter tank at a suitable stripping temperature.

During the progress of the fission product gases through the irradiation facility 218, the absorption drier 250 and the hold-up cooler 262, these gases have been held up for a time sufficient to allow the short-lived krypton isotopes to decay to such low values that the remaining krypton activity is substantially that due to $Kr_{85}$, which has a half-life of 10.4 years. Hence, the remaining krypton may safely be discharged to the atmosphere without further hold-up. The charcoal tanks 270 to 276 therefore are designed so that they will absorb the xenon isotopes but will allow the krypton to pass through. The charcoal adsorption tanks are operated at an average temperature of 122° F. as aforesaid, and in this arrangement each one is capable of holding 54 days of xenon production.

As shown by a reference to FIGS. 3A, 3B and 4 of the drawings, while one of the charcoal tanks, for example, 270 is on the adsorption portion of its cycle, two others of the charcoal tanks, for example, 272 and 274 are operated on the decay and regeneration portions of the cycle while the fourth tank 276 serves as a spare.

If the fission product gases were not held up before entering the charcoal tanks, by the hold-up cooler 262, they would be approximately 12 hours old, assuming a nominal 12 hour hold-up in the irradiation facility 218. After this time the krypton activity (Table I) in excess of that due to the 10.4 year $Kr^{85}$ would amount to $2.2 \times 10^{21}$ mev./day which is too high to be discharged. The charcoal tank would therefore have to be designed to absorb all of the krypton isotopes, and in this case, about 615 cubic feet of additional charcoal would be required. By holding-up the fission product gases for an additional 36 hours in the hold-up cooler 262, as aforesaid, the charcoal tanks 270 to 276 can be designed for adsorption of only the xenon isotopes. The total krypton activity then is not significantly above that of $Kr^{85}$ and can be discharged to the atmosphere in a suitable manner.

However, to meet inclement weather conditions it is desirable to provide the additional adsorption capacity for the krypton isotopes in the spare charcoal tank 276, which contains approximately 615 cubic feet of charcoal in this example. In such contingency one of the smaller and ordinarily operated charcoal tanks 270, 272, or 274, can be coupled in tandem by means presently to be described, with the spare tank 276 so that all of the xenon and krypton can be adsorbed for a period of 54 days. Obviously, if desired two or more of the smaller tanks can be paralleled and at the same time connected in tandem to the spare tank in the event of severely adverse weather conditions.

The diameter and length of the charcoal tanks noted heretofore are calculated from the following considerations.

The tubes will be sized so that the average temperature of the bed never exceeds 122° F.

Weight of adsorbed Xe/ft.$^3$ bed=27.3 g./ft.$^3$ at an average temperature of 122° F. and a pressure of 20 p.s.i.a.

From FIG. 5, heat output of Xe=7 B.t.u./hr./gram of fission product gases=9.4 B.t.u./hr./gram of xenon. $q=27.3 \times 9.4=256$ B.t.u./hr./ft.$^3$ of bed.

The average temperature of the bed is given by:

$$T_{av} = T_{coolant} + \frac{.053qr}{k} \quad (14)$$

where:

$q$=heat output.
$r$=radius of bed.
$k$=thermal conductivity of bed.

Since the gas velocity is so low, the bed conductivity ($k$) may be determined as if the gas were stagnant. Using the procedure suggested by McAdams, "Heat Transmission" (third edition) page 290, the conductivity of the bed filled is estimated as 0.25, when helium is employed as the carrier gas. For 72° F. cooling water and 122° F. average temperature:

$$T_{av} - T_{coolant} = 50° F.$$

$$50° F. = \frac{.053qr}{.25}$$

$$r = 0.92 \text{ ft.} \quad (15)$$

The allowable tube diameter, then is 1.84 ft. in this case and represents the maximum size of tube containing charcoal and adsorbed gases which can be cooled by an external water jacket to 122° F. during anticipated summer weather condition, with readily available cooling water.

The volume of charcoal required in each bed is calculated from the following considerations, assuming that helium is used as the carrier gas.

Partial pressure of Xe in entering stream=1.105 mm. Hg.
Partial pressure of Kr in entering stream=0.46 mm. Hg.

By extrapolation of the data of Oak Ridge Report CF–52–11–39, it is found that at 122° F.:

equilibrium weight of xenon adsorbed/kg. charcoal=2.01 g./kg.
equilibrium weight of Kr adsorbed/kg. charcoal=.05 g./kg.

The usual procedure for the design of adsorption beds is to use the method of Hougen and Marshall, Chemical Engineers Handbook, McGraw-Hill, third edition, page 882. However, the Hougen and Marshall charts do not extend to the long adsorption time required. Use is therefore made of the approximation that at long adsorption times, the bed volume required can be obtained from the equilibrium data.

Weight of Xe adsorbed in 54 days=weight of stable Xe produced (Table I)+equilibrium weight.
Weight of unstable isotopes=5150 gms.

$$\text{Weight of bed required} = \frac{5150 \text{ gms. Xe}}{2.01 \frac{\text{gm. Xe}}{\text{kg. charcoal}}}$$

$$= 2560 \text{ kg. charcoal} = 5632 \text{ lbs.}$$

Volume of bed for Xenon adsorption $$= \frac{5632 \text{ lbs.}}{30 \text{ lbs./ft.}^3} = 188 \text{ ft.}^3 \text{ charcoal}$$

Time required to traverse bed $$= \frac{(\text{Bed Volume}) \times (\text{External Void Fraction})}{(\text{Volumetric Flow Rate})}$$

$$= \frac{89 \text{ ft.}^3}{22.5 \text{ ft.}^3/\text{hr.}} = 3.95 \text{ hours}$$

Based upon the considerations outlined above and using 20" diameter pipe as a bed container, 105 ft. of tank length are required for the tanks 270, 272, and 274.

Referring now to FIG. 4 of the drawings, the cyclic operation of the charcoal tanks 270, 272 and 274 is shown graphically. The pair of vertical lines 282 represent the point at which the reactor 20 begins power operation, and is taken as zero time for purposes of this graph. The single vertical lines 284 each represent a complete cycle of adsorption, decay and regeneration as applied to any one of the charcoal tanks, which cycle equals, in this example, a total of 162 days. For purposes of explanation, each 162 day cycle is subdivided into increments of 54 days each as indicated by the reference characters 286. The horizontal lines 270', 272' and 274' correspond to the charcoal tanks illustrated in FIG. 3.

At the beginning of reactor operation, the charcoal tank 270 is coupled to the hold-up cooler 262 and to a stack blower 296 by opening valves 288 and 302 in the associated ones of the conduits 280 and 301, respectively (FIG. 3A). The tank 270 is then maintained in the adsorption portion of its cycle for a 54 day period while the remaining of the tanks 272, 274, and 276 are decoupled from the system by shutting off their associated valves 292—303, 294—305, and 295—307 respectively. At the end of the first 54 day period, the charcoal tank 270 is decoupled from the system by closing the valves 288 and 302, and then proceeds to the decay portion of its cycle, which in this example is 90.5 days as represented by arrow 290 (FIG. 4). At the same time, the tank 272 is coupled to the system by opening its associated valves 292 and 303 in order to initiate the adsorption portion of its cycle. At the end of the second 54 day increment, the third charcoal tank 274 is coupled into the system by opening its associated valves 294 and 305. At the same time the second tank 272 is decoupled from the system for the decay portion of its cycle. Seventeen and one-half days before the end of the third 54 day increment, the decay period of the first charcoal tank 270 is terminated and the charcoal contained within this tank is regenerated by drawing ventilation air through the charcoal tank 270 by means of a stack blower 296. This ventilation air is supplied to and withdrawn from the charcoal tanks by means of conduits 297, 299, and 316 respectively.

The ventilation air, which is collected from the nuclear reactor plant, is first conducted to a dust filter 298 through conduit 301 and thence to selected ones of the charcoal tanks 270, 272, and 274 by opening appropriate ones of the valves 300 and 302—307. Regeneration of the charcoal contained within each tank is attained by reducing the cooling water normally supplied to the charcoal tanks by closing the associated one of the valves 311 in the cooling water system. The heat developed by residual radioactivity at the end of the decay cycle of 90.5 days, or about 140 B.t.u. per minute as indicated heretofore, is sufficient to raise the charcoal to a temperature of about 212° F. at which the adsorbed xenon isotopes are removed from the charcoal and are carried by the blower 296 through the conduits 299 and 316 and stack inlet conduit 308.

The ventilation air thus serves to dilute and to flush the stripped xenon isotopes and residual krypton isotopes and carrier gas out of the charcoal tank being regenerated. Any ventilation air not required for regenerating one of the charcoal tanks is conducted to the suction side of the stack blower 296 by means of a ventilation air by-pass conduit 309.

In a similar manner, any gaseous fission products removed by the chemical processing plant 106 (FIG. 2) are conducted to the cold trap inlet conduit 226. From this point the effluent gases of the chemical plant 106 are treated as explained heretofore in connection with the gaseous output of the irradiation facility 218 or of the mist collector 204. The processing plant gases are added at this point in the gas handling system for the reason that these gases may contain residual amounts of valuable $D_2O$ vehicle, in the example.

As indicated heretofore, the radioactivity due to the longest-lived of the adsorbed xenon isotopes, which at the end of the decay cycle of 90.5 days is principally $Xe^{131}$, is approximately 20% of the activity due to the non-adsorbed $Kr^{85}$ isotope contained within the charcoal tank 270. Thus, the heat required to regenerate the charcoal is furnished by decay heat of the adsorbed $Xe^{131}$ isotope and residual $Kr^{85}$. At the end of the regeneration portion of the cycle, which is indicated by the reference character 306 (FIG. 4), the charcoal tank 270 is again prepared for the adsorption portion of a subsequent operating cycle. In a similar manner, the charcoal tanks 272 and 274 are alternately operated through the cyclic functions of adsorption, decay, and regeneration, as explained heretofore.

In the event of inclement weather the spare charcoal tank 276 is coupled in tandem with the adsorption tank, for example the tank 270, by opening valves 302 and 307 and closing valve 312 in conduit 316. The effluent gases of the charcoal tank 270 then are conducted through the conduit 299 and associated ones of the conduits 301 to the spare charcoal tank 276. The major portion of the krypton isotopes are adsorbed in the spare tank 276, with the remainder having been adsorbed previously in the smaller charcoal tank 270. The effluent gases of the spare charcoal tank, which are now substantially free of xenon and krypton, are conveyed to the stack 304 through valved outlet conduit 318, conduits 257 and 316, and the stack blower 296. If, for any reason, the radioactive gases cannot be discharged for a period longer than 54 days the flow control valve 314 can be shut off, thereby permitting the fission gases to accumulate within the gas handling system.

In this arrangement of the invention, the stack 304 is approximately 250 feet in height above ground level, which height is sufficient to reduce by diffusion the activity of those fission product gases eliminated from the top of the stack to acceptable levels at a point on ground level at the base of the stack. However, the activity level of the fission product gases at the mouth 310 of the stack is approximately 100 times that of accepted standards. In the event of adverse weather conditions, such as a temperature inversion at which time it would be virtually impossible to exit the fission product gases to the atmosphere due to the then inadequate dispersion of the gases, the spare tank 276 can be utilized or the gas handling system can be shut down as aforesaid for at least the duration of anticipated adverse weather conditions. The valve 314 provided adjacent the suction side of the stack blower 296 controls the rate of flow to the stack 304 and consequently the level of radioactivity discharged to the atmosphere.

In a similar manner any gaseous fission products removed by the chemical processing plant 106 (FIG. 2) are conducted to the cold trap inlet conduit 226 through conduit 112 (FIGS. 2 and 3A). From this point the effluent gases of the processing plant 106 are treated as explained heretofore in connection with the effluent gases of the irradiation facility 218 or of the mist collector 204. The processing plant gases are desirably added at this point in the gas handling system inasmuch as these gases may contain residual amounts of valuable $D_2O$ vehicle, in this case.

From the foregoing, it will be apparent that a novel and efficient radioactive gas handling system has been disclosed herein. Although the invention has been described primarily in connection with a quasi-homogeneous type reactor, it will be obvious that this arrangement can be applied to any known reactor system from which fission product gases are evolved during reactor operation. The slight differences which may occur in material balance between the xenon and krypton fission gases due to the power level of the reactor and to the type of fissionable isotope can be adjusted readily by application of the consideration noted heretofore. By the same token, the principles of adsorption, decay or regeneration of the adsorbing beds disclosed herein can be adapted also for use with a plutonium reactor, with the type and quantity of adsorbing agent being adjusted to the gases resulting from plutonium fission. Moreover, the gas handling system of the invention is readily adaptable for use with the radioactive gases usually evolved from a clad-fuel handling plant or the like.

It is to be understood, furthermore, that the reactor system parameters including those associated with the off-gas system of the invention, and other descriptive matter presented herein are employed only for purposes of illustrating the invention. Such descriptive matter then, is not to be construed as limitative of the invention. For an example, as pointed out heretofore the type and quantity of radioactive gases and the absorbent handled by the gas-handling system of the invention can be varied readily without departing from the teachings thereof.

Accordingly, numerous modifications of the invention will occur to those skilled in the art without departing from the spirit and scope of the invention. Moreover, it is to be understood that certain features of the invention can be utilized without a corresponding use of other features.

Accordingly, what is claimed as new is:

1. In a gas handling system adapted for use with a mixture of radioactive isotopes of xenon and krypton, the combination comprising means for holding up and for cooling said gases for a time sufficient to permit substantial radioactive decay of at least the shorter-lived isotopes in said mixture, a plurality of adsorption tanks, each of said tanks containing a quantity of adsorptive material capable of adsorbing substantially all of said xenon isotopes but only a portion of said krypton isotopes, radioactive gas disposal means, valved conduit means coupled to all of said tanks for conveying said isotopes from said holding and cooling means to a selected one of said tanks for adsorption therein, an additional adsorption tank containing a quantity of adsorptive material for adsorbing said isotopes, additional valved conduit means coupled to said first-mentioned tanks and to said additional tank for connecting said additional tank in tandem to at least one of said first-mentioned tanks and to said disposal means, the total quantity of said adsorptive material in the tandemly connected tanks being sufficient to adsorb substantially all of said xenon and said krypton isotopes, said first-mentioned valved conduit means and said additional valved conduit means being cooperative for selectively isolating each of said first-mentioned tanks for a time sufficient to permit substantial radioactive decay of the radioactive isotopes adsorbed therewithin, and means for regenerating each of said tanks, whereby each of said first-mentioned tanks can be cyclically operated for the purposes of adsorption, isolation for radioactive decay, and regeneration.

2. In a gas handling system adapted for use with a mixture of relatively longer-lived and shorter-lived radioactive gases, the combination comprising a plurality of adsorption tanks, each of said tanks containing adsorptive material capable of selectively adsorbing substantially all of said shorter-lived gases, radioactive gas disposal means, valved conduit means coupled to all of said tanks for connecting a selected one of said tanks to said disposal means and to a source of said gases, a source of regenerative fluid for said adsorption tanks, additional valved conduit means coupled to all of said tanks for connecting a selected one thereof to said regenerative fluid source and to said disposal means to permit regeneration of said tanks when so coupled, said first-mentioned valved conduit means and said additional valved conduit means being cooperative for selectively isolating each of said tanks for a time sufficient to permit substantial radioactive decay of the radioactive gases adsorbed therewithin, an additional adsorption tank containing an adsorptive material capable of adsorbing said gases, and conduit means for selectively coupling said additional tank in tandem to at least one of said first-mentioned tanks, the tandemly connected tanks together being capable of adsorbing substantially all of both said shorter-lived and said longer-lived radioactive gases.

3. In a gas handling system adapted for use with a mixture of relatively longer-lived and shorter-lived radioactive gases, the combination comprising a plurality of adsorption tanks each containing an adsorptive material capable of selectively adsorbing substantially all of said shorter-lived gases, radioactive gas disposal means, valved conduit means coupled to all of said tanks for connecting a selected one of said tanks to a source of said radioactive gases and to said disposal means, an additional adsorption tank containing an adsorptive material cpable of adsorbing said gases, additional valved conduit means coupled to said additional tank for connecting said additional tank selectively to each of said first-mentioned tanks and to said disposal means, the tandemly connected tanks together being capable of adsorbing substantially all of both said shorter-lived and said longer-lived radioactive gases, means for isolating each of said tanks to permit at least partial decay of the radioactive gases adsorbed therein, and means for regenerating the adsorptive material contained in each of said tanks, whereby said first-mentioned tanks can be cyclically operated for purposes of adsorption, isolation for radioactive decay, and regeneration.

4. In a gas handling system adapted for use with a mixture of relatively longer-lived and shorter-lived radioactive gases, the combination comprising a plurality of adsorption tanks each containing a quantity of adsorptive material capable of preferentially adsorbing said shorter-lived gases, radioactive gas disposal means, valved conduit means coupled to all of said tanks for connecting a selected one of said tanks to said disposal means and to a source of said gases to permit adsorption of substantially all of said shorter-lived gases, an additional adsorption tank containing adsorptive material capable of adsorbing said gases, additional valved conduit means coupled to said first-mentioned tanks and to said additional tank for connecting said additional tank in tandem to a selected one of said first-mentioned tanks and to said disposal means, the tandemly connected tanks together being capable of adsorbing substantially all of both said shorter-lived gases and said longer-lived gases, said first-mentioned valved conduit means and said additional valved conduit means being cooperative for selectively isolating each of said first-mentioned and said additional tanks for a time sufficient to permit substantial radioactive decay of the radioactive gases adsorbed therewithin, a source of regenerative fluid, and a valved conduit system coupled to all of said first-mentioned and said additional tanks for connecting a selected one thereof to said regenerative fluid source and to said disposal means, whereby at least said first-mentioned tanks can be cyclically operated for purposes of adsorption, isolation for radioactive decay, and regeneration.

5. In a gas handling system adapted for use with radioactive gases, the combination comprising a plurality of adsorption tanks each containing a quantity of adsorptive material capable of adsorbing at least a portion of said gases, a source of regenerative fluid for said adsorptive material, radioactive gas disposal means, valved conduit means coupled to all of said tanks for connecting a selected one of said tanks to a source of said radioactive gases to permit adsorption thereof within said tanks, additional valved conduit means coupled to all of said tanks for connecting a selected one of said tanks to said regenerative fluid source and to said disposal means to permit regeneration of said tanks when so coupled, said first-mentioned valved conduit means and said additional valved conduit means being cooperative for selectively isolating each of said tanks for a time sufficient to permit substantial radioactive decay of the radioactive gases adsorbed therewithin, heat exchanging conduit means for supplying cooling fluid to each of said tanks to remove the heat of radioactive decay therefrom, and valve means coupled in said heat exchanging conduit means at positions adjacent each of said tanks respectively to isolate each of said tanks from said cooling fluid when that tank is coupled to said source of regenerative fluid in order to retain the heat of radioactive decay within said last-mentioned tank to facilitate regeneration thereof.

6. In a gas handling system for radioactive gases and adapted for use with a nuclear reactor system, means coupled to said reactor system for separating fissional gases therefrom, a hold-up cooler coupled to said separating means for holding up and for cooling said gases for a time sufficient to permit substantial radioactive decay of the short-lived components of said fissional gases, a plurality of adsorption tanks each containing a quantity of adsorptive material capable of preferentially adsorbing the intermediate-lived components of said fissional gases, radioactive gas disposal means, valved conduit means coupled to all of said tanks for conveying said gases from said hold-up cooler to a selected one of said tanks to permit adsorption of said gases therewithin and for conveying the non-adsorbed longer-lived components of said gases from said selected tank to said gas disposal means, additional valved conduit means coupled to all of said tanks for connecting a selected one of said tanks to said sources and to said disposal means to permit regeneration of said tanks when so coupled, and said first-mentioned valved conduit means and said additional valved conduit means being cooperative for selectively isolating each of said tanks for a time sufficient to permit substantial radioactive decay of the intermediate-lived fissional gases adsorbed therewithin, whereby said tanks can be cyclically operated for the purposes of adsorption, isolation for radioactive decay, and regeneration.

References Cited in the file of this patent

UNITED STATES PATENTS

| | | |
|---|---|---|
| 1,335,348 | Patrick et al. | Mar. 30, 1920 |
| 2,137,605 | Derr | Nov. 22, 1938 |
| 2,157,565 | Pexton et al. | May 9, 1939 |
| 2,635,707 | Gilmore | Apr. 21, 1953 |
| 2,675,089 | Kahle | Apr. 13, 1954 |
| 2,698,523 | Hnilicka | Jan. 4, 1955 |
| 2,770,591 | Wigner et al. | Nov. 13, 1956 |
| 2,810,454 | Jones et al. | Oct. 22, 1957 |
| 2,825,688 | Vernon | Mar. 4, 1958 |

OTHER REFERENCES

U.S. Atomic Energy Commission, ORO-33, July 5, 1950, pp. 43-47.

Proceedings of the International Conference on the Peaceful Uses of Atomic Energy. Held in Geneva. Aug. 8-20, 1955. United Nations, N.Y. 1956, pages 731-734.

Nuclear Science and Engineering, vol. 2, pp. 582, 591, 593, 596, September 1957.

Nucleonics, September 1954, pages 16-19.

Progress in Nuclear Energy Series II Reactors, Charpie et al., McGraw-Hill Book Co., N.Y., 1956, pp. 359-371.

TID 5275, Research Reactors, U.S. Atomic Energy Commission Library, October 10, 1955, pp. 41, 42, 77, 84.